(12) United States Patent
Swift et al.

(10) Patent No.: US 10,815,827 B2
(45) Date of Patent: Oct. 27, 2020

(54) VARIABLE THICKNESS CORE FOR GAS TURBINE ENGINE COMPONENT

(71) Applicant: UNITED TECHNOLOGIES CORPORATION, Farmington, CT (US)

(72) Inventors: Anthony B. Swift, Waterboro, ME (US); Ken F. Blaney, Middleton, NH (US); Paul M. Lutjen, Kennebunkport, ME (US); Neil L. Tatman, Brentwood, NH (US); Dominic J. Mongillo, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 326 days.

(21) Appl. No.: 15/005,061

(22) Filed: Jan. 25, 2016

(65) Prior Publication Data

US 2017/0211415 A1      Jul. 27, 2017

(51) Int. Cl.
*F01D 25/12* (2006.01)
*B22C 9/10* (2006.01)
(Continued)

(52) U.S. Cl.
CPC .............. *F01D 25/12* (2013.01); *B22C 9/103* (2013.01); *F01D 5/14* (2013.01); *F01D 5/187* (2013.01); *F01D 9/041* (2013.01); *F01D 11/08* (2013.01); *F02C 7/12* (2013.01); *F05D 2220/32* (2013.01); *F05D 2230/10* (2013.01); *F05D 2230/211* (2013.01); *F05D 2230/30* (2013.01);
(Continued)

(58) Field of Classification Search
CPC ......... B22C 9/103; F01D 25/12; F01D 11/08; F01D 11/24; F05D 2230/211
See application file for complete search history.

(56) References Cited

U.S. PATENT DOCUMENTS 5,486,090 A *   1/1996  Thompson .............. F01D 11/08
                                                    415/173.1
5,584,651 A    12/1996  Pietraszkiewicz et al.
(Continued)

FOREIGN PATENT DOCUMENTS

| WO | 2015021029 | 2/2015 |
| WO | 2015069338 | 5/2015 |
| WO | 2015175042 | 11/2015 |

OTHER PUBLICATIONS

U.S. Appl. No. 14/616,999.
U.S. Appl. No. 14/948,669.
U.S. Appl. No. 14/872,272.

*Primary Examiner* — Todd E Manahan
*Assistant Examiner* — Katheryn A Malatek
(74) *Attorney, Agent, or Firm* — Carlson, Gaskey & Olds, P.C.

(57) ABSTRACT

A gas turbine engine component has a body extending between two circumferential sides, and between a leading edge and a trailing edge. A refractory metal core within the body forms at least one cooling circuit to utilize fluid to cool the body. When the refractory metal core is removed from the body, the at least one cooling circuit includes an inlet, an outlet, and a passage that varies in cross-sectional area between the inlet and outlet. A method of manufacturing a gas turbine engine, a method of manufacturing a core, and a refractory metal core are also disclosed.

26 Claims, 4 Drawing Sheets

(51) Int. Cl.
  *F01D 5/18* (2006.01)
  *F01D 5/14* (2006.01)
  *F01D 9/04* (2006.01)
  *F01D 11/08* (2006.01)
  *F02C 7/12* (2006.01)

(52) U.S. Cl.
  CPC .... *F05D 2240/11* (2013.01); *F05D 2250/323* (2013.01); *F05D 2250/324* (2013.01); *F05D 2260/202* (2013.01)

(56) References Cited

U.S. PATENT DOCUMENTS

| | | |
|---|---|---|
| 6,913,064 B2 | 7/2005 | Beals et al. |
| 7,621,719 B2 | 11/2009 | Lutjen et al. |
| 7,686,068 B2 | 3/2010 | Tholen et al. |
| 7,874,792 B2 | 1/2011 | Tholen et al. |
| 7,959,407 B2 | 6/2011 | Tholen |
| 2004/0090013 A1* | 5/2004 | Lawer ............... F01D 11/08 277/412 |
| 2009/0095435 A1* | 4/2009 | Luczak ............... B22C 9/04 164/61 |
| 2010/0080707 A1* | 4/2010 | Tholen ............... B22C 9/04 416/179 |
| 2013/0340966 A1 | 12/2013 | Tholen et al. |
| 2014/0030071 A1 | 1/2014 | Leslie et al. |
| 2015/0300195 A1 | 10/2015 | Lutjen et al. |

* cited by examiner

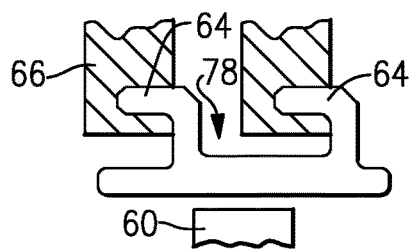
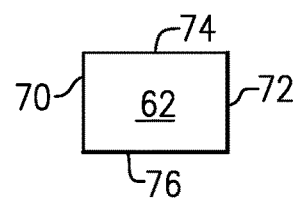
FIG.2          FIG.3
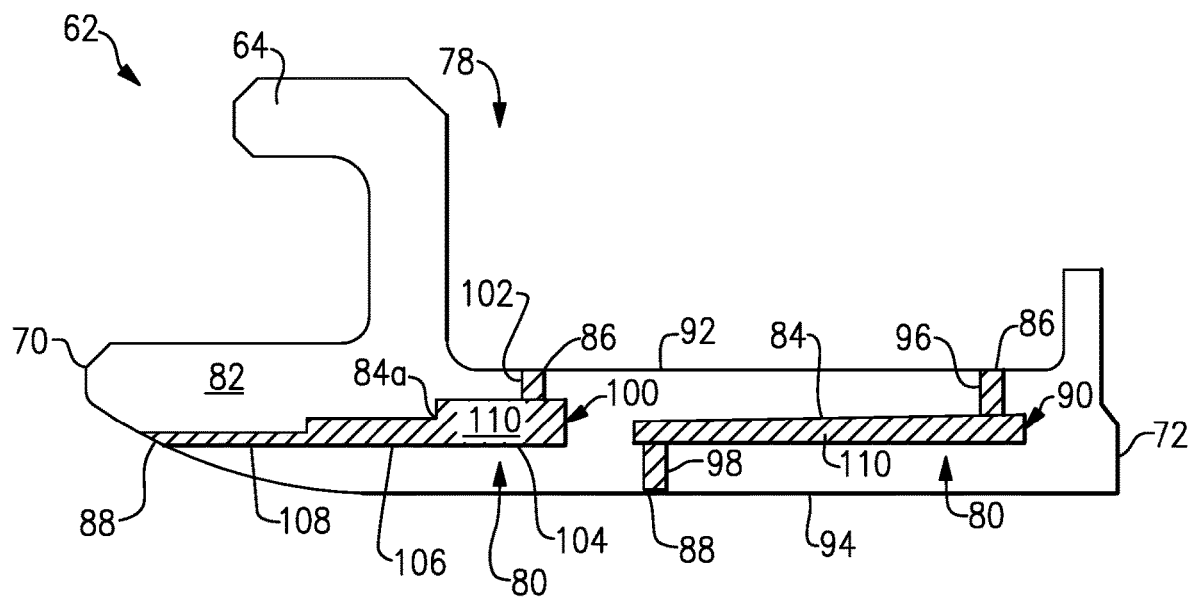
FIG.4
FIG.4A
FIG.4B

VARIABLE THICKNESS CORE FOR GAS TURBINE ENGINE COMPONENT

STATEMENT REGARDING FEDERALLY SPONSORED RESEARCH OR DEVELOPMENT

This invention was made with government support under Contract No. FA8650-09-D-2923 0021 awarded by the United States Air Force. The Government has certain rights in this invention.

BACKGROUND OF THE INVENTION

Gas turbine engines include one or more turbine stages. Each stage includes a plurality of blades mounted to a disc that is fixed for rotation with a turbine shaft. It is desirable to have the bulk of the products of combustion pass over the turbine blade. Thus, a blade outer air seal is placed circumferentially about the turbine rotors slightly radially spaced from a radially outer surface of the turbine blades. The blade outer air seal is in a harsh environment, and must be able to withstand high temperatures. To address the high temperatures, the blade outer air seal is typically provided with internal cooling passages. Air circulates through the cooling passages to cool the blade outer air seal. These cooling passages also include pedestals and trip strips to further improve cooling efficiency.

One method of forming the cooling passages within the blade outer air seal is to use a lost core molding process. A ceramic core is provided which forms the cooling passages and which includes augmentation features to form the pedestals and trip strips. The current way to change the cooling value of a given core that uses augmentation features is to change the size, shape, or count of the augmentation features. Obtaining the correct combination of cooling features can be difficult and time consuming. Further, this multitude of different combinations of cooling features can also lead to higher tooling costs and longer lead times for manufacturing, which are undesirable.

SUMMARY OF THE INVENTION

In a featured embodiment, a gas turbine engine component has a body extending between two circumferential sides, and between a leading edge and a trailing edge. A refractory metal core within the body forms at least one cooling circuit to utilize fluid to cool the body. When the refractory metal core is removed from the body, the at least one cooling circuit includes an inlet, an outlet, and a passage that varies in cross-sectional area between the inlet and outlet.

In another embodiment according to the previous embodiment, the passage has a planar or curved tapered cross-sectional area.

In another embodiment according to any of the previous embodiments, that tapered cross-sectional area decreases in size from the inlet to the outlet.

In another embodiment according to any of the previous embodiments, the passage has a planar or curved stepped cross-sectional area.

In another embodiment according to any of the previous embodiments, the stepped cross-sectional area decreases in size from the inlet to the outlet.

In another embodiment according to any of the previous embodiments, the passage includes at least a first stepped section and a second stepped section downstream of the first stepped section, and wherein the first stepped section has a greater cross-sectional area than the second stepped section.

In another embodiment according to any of the previous embodiments, the cross-sectional area of the passage progressively increases from the inlet to the outlet, or progressively increases from the outlet to the inlet.

In another embodiment according to any of the previous embodiments, the cross-sectional area of the passage has increasing and decreasing portions between the inlet and the outlet.

In another embodiment according to any of the previous embodiments, the body comprises one of a blade outer air seal, airfoil, or combustor component.

In another featured embodiment, a gas turbine engine has a compressor section rotatable about an engine axis, the compressor section comprising a plurality of stages that include a plurality of compressor blades and vanes. A combustor section is downstream of the compressor section, and includes at least one combustor component to be cooled. A turbine section is downstream of the combustor section, and comprises a plurality of stages that include a plurality of turbine blades and vanes. At least one blade outer air seal is positioned radially outward of the plurality of compressor or turbine blades. At least one of the compressor blades and vanes, the turbine blades and vanes, the combustor component, and the blade outer air seal includes a body extending between two circumferential sides, and between a leading edge and a trailing edge, and a refractory metal core within the body to form at least one cooling circuit within the body to utilize fluid to cool the body. When the refractory metal core is removed from the body, the at least one cooling circuit includes an inlet, an outlet, and a passage that varies in cross-sectional area between the inlet and outlet.

In another embodiment according to the previous embodiment, the passage has at least one of a planar or curved tapered cross-sectional area, or a planar or curved stepped cross-sectional area.

In another embodiment according to any of the previous embodiments, the tapered cross-sectional area or stepped cross-sectional area decreases in size from the inlet to the outlet or increases in size from the inlet to the outlet.

In another embodiment according to any of the previous embodiments, the stepped cross-sectional area or tapered cross-sectional area has both increasing and decreasing portions between the inlet and the outlet.

In another embodiment according to any of the previous embodiments, the inlet is in a radially outer external surface of the body and the outlet is in a radially inner external surface, and wherein the passage extends in a generally axial direction between the inlet and the outlet.

In another embodiment according to any of the previous embodiments, the at least one cooling circuit comprises at least first and second cooling circuits each having an inlet, and outlet, and a passage extending between the inlet and outlet. The passage of the first cooling circuit has a first variable cross sectional area and the passage of the second cooling circuit has a second variable cross sectional area that is different than the first variable cross-sectional area.

In another embodiment according to any of the previous embodiments, the first variable cross-sectional area comprises a tapered cross-sectional area and the second variable cross-sectional area comprises a stepped cross-sectional area.

In another featured embodiment, a method of manufacturing a gas turbine engine component includes forming a refractory metal core to form a body for one of a blade outer air seal, airfoil, or combustor component. The refractory metal core is provided with at least one portion to form at least one cooling passage within the body wherein the portion has a variable cross-sectional area. Material is provided about the refractory metal core to form the body. The refractory metal core is removed to form the body with the at least one cooling passage having a variable cross-sectional area.

In another embodiment according to the previous embodiment, the variable cross-sectional area is at least one of a planar or curved tapered cross-sectional area, or a planar or curved stepped cross-sectional area.

In another featured embodiment, a method of manufacturing a core comprising the steps of providing a refractory metal core configured to form a body for one of a blade outer air seal, airfoil, or combustor component. Details are machined into the refractory metal core to define at least one cooling passage to be formed in the blade outer air seal, airfoil, or combustor component. A desired variable cross-sectional area is determined to be used to form the cooling passage based on pressure loss and heat transfer consideration for a specific application for the blade outer air seal, airfoil, or combustor component. The details of the core are machined to provide a variable thickness of the core such that the corresponding cooling passage will have the desired variable cross-sectional area.

In another embodiment according to any of the previous embodiments, the core is formed to provide a desired cooling passage configuration by using one or more of the following manufacturing steps: grinding, etching, EDM, ECM, coining, mechanical machining, rolling, and an additive manufacturing process.

In another featured embodiment, a refractory metal core has a core body formed from a refractory metal material. The core body is configured to form one of a blade outer air seal, airfoil, or combustor component. At least one cooling passage feature is formed as part of the core body wherein the cooling passage feature is configured to form an associated cooling passage within the one of the blade outer air seal, airfoil, or combustor component, and wherein the at least one cooling passage feature comprises a variable cross-sectional area.

In another embodiment according to the previous embodiment, the variable cross-sectional area is at least one of a planar or curved tapered cross-sectional area, or a planar or curved stepped cross-sectional area.

In another embodiment according to any of the previous embodiments, the at least one cooling passage feature includes at least one contracted passage portion having a first cross-sectional area and at least one expanded passage portion having a second cross-sectional area greater than the first cross-sectional area.

In another embodiment according to any of the previous embodiments, the at least one expanded passage portion comprises a first expanded passage portion configured to be adjacent to a cooling passage outlet and a second expanded passage portion configured to be adjacent to a cooling passage inlet, and wherein the at least one contracted passage portion is positioned between the first and second expanded passage portions.

These and other features may be best understood from the following drawings and specification.

BRIEF DESCRIPTION OF THE DRAWINGS

FIG. 2 is a schematic representation of a blade outer air seal in a turbine section of the engine of FIG. 1.

FIG. 3 is a schematic top view of the blade outer air seal of FIG. 2.

FIG. 4 is a section view of the blade outer air seal incorporating the subject invention.

FIG. 4A shows another example of a core body portion in a blade outer air seal as shown in FIG. 4.

FIG. 4B shows another example of a core body portion in a blade outer air seal as shown in FIG. 4.

DETAILED DESCRIPTION

Figure 1:
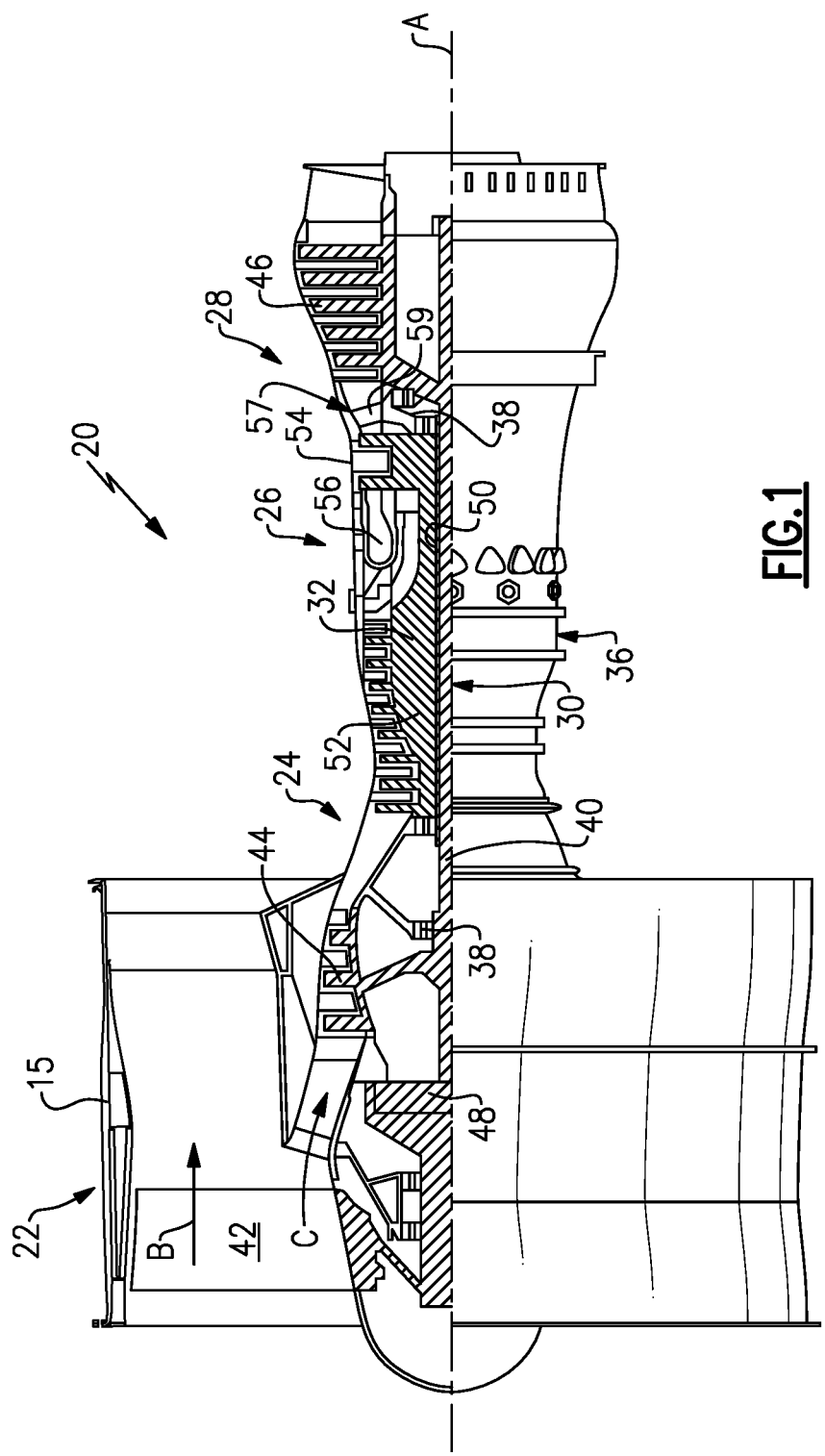
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

FIG. 2 shows a portion of the gas turbine engine 20 having rotating turbine blades 60, and a blade outer air seal (BOAS) 62 spaced slightly radially outwardly of the outermost portion of the turbine blade 60. As shown, hooks 64 hold the blade outer air seal 62 onto an engine static structure 66. As known, typically, dozens of sections of the blade outer air seal 62 are positioned circumferentially adjacent to each other to surround the turbine blades 60 and their associated rotor.

FIG. 3 is a schematic top view of the blade outer air seal 62 and shows a leading edge 70 and a trailing edge 72. Circumferential sides 74 and 76 sit adjacent to another section of blade outer air seal 62 when the blade outer air seal 62 is assembled within the gas turbine engine 20.

As shown in FIG. 4, an air space 78 supplies air to at least one cooling circuit 80 provided within a body 82 of the blade outer air seal 62 to utilize fluid to cool the body 82. The cooling circuit 80 includes one or more cooling channels or passages 84, 84a that are formed within the body 82 of the blade outer air seal 62. The cooling circuit 80 includes at least one inlet 86 and at least one outlet 88. Each cooling passage 84 extends from one inlet 86 to one outlet 88. At least one cooling passage 84 varies in cross-sectional area between the inlet 86 and outlet 88.

In one example, the passage 84 has a tapered cross-sectional area as indicated at 90. The tapered cross-sectional area 90, for example, decreases in cross sectional area by tailoring the channel height and/or channel width from the inlet 86 to the outlet 88. Optionally, the tapered cross-sectional area 90, could increase in cross-sectional area by similarly tailoring the channel height and/or channel width from the inlet 86 to the outlet 88, or could alternate between increasing and decreasing channel height and/or channel widths depending on the heat transfer and pressure loss considerations necessary to provide adequate local convective and/or film cooling to offset non uniform local external heat flux distributions. In this manner, both the local cooling flow requirements and local thermal cooling effectiveness can be better tailored and optimized to meet component durability life objectives. The passage 84 extends in a generally axial direction that corresponds to the direction of the engine center axis A. The inlet 86 is in a radially outer external surface 92 of the body 82 and the outlet 88 is in a radially inner external surface 94 of the body 82. A first passage portion 96 extends radially inward from the inlet 86 toward the passage 84, and a second passage portion 98 extends radially outward from the outlet 88 toward the passage 84. The passage 84 extends in a generally axial direction between the first 96 and second 98 passage portions.

In another example, a passage 84a has a stepped cross-sectional area as indicated at 100. The stepped cross-sectional area, for example, decreases in size from the inlet 86 to the outlet 88. Optionally, the stepped cross-sectional area 90, could increase in size from the inlet 86 to the outlet 88, or could alternate between increasing and decreasing cross-sectional area by varying either the channel height and/or channel width to better manage internal pressure loss, cooling air heat pickup, and backside coolant convective heat transfer in order to optimize the thermal cooling effectiveness distribution to offset non uniform local external heat flux distributions commonly observed along the blade outer air seal gas path surface 94. The passage 84a extends in a generally axial direction that corresponds to the direction of the engine center axis A. The inlet 86 is in the radially outer external surface 92 of the body 82 and the outlet 88 is in the radially inner external surface 94 of the body 82.

A first passage portion 102 extends radially inward from the inlet 86 toward the passage 84a. The passage 84a includes at least a first stepped section 104 and a second stepped section 106 downstream of the first stepped section 104. The first stepped section 104 has a greater cross-sectional area than the second stepped section 106. The passage 84a could also be comprised of N-number of additional stepped geometry sections including both expanding (increasing) and/or contracting (decreasing) cross-sectional areas. In the example shown, the passage 84a includes a third stepped section 108 downstream of the second stepped section 106. The second stepped section 106 has a greater cross-sectional area than the third stepped section 108. Thus, in the example shown, each stepped section decreases in size in the direction from the inlet 86 to the outlet 88.

In reference to FIG. 4, FIG. 4A and FIG. 4B, the stepped cooling passages formed by core bodies 110, 110A, and 110B enable the incorporation of film cooling holes coincident with locations where the cross-sectional area of the cooling passage is expanding (increasing) and correspondingly the height of cooling passage is also increased. Incorporating stepped cooling passage geometries similar to those formed by core bodies 110, 110A, and 110B enables locally high internal passage velocities, Mach Numbers in the contracting (decreasing) sections of the cooling passage coincident with smaller cross-sectional flow areas. At these locations, relatively high internal convective heat transfer coefficients can be generated, in turn resulting in a significant increase in the temperature of the coolant fluid. In order to mitigate the additional cooling air heat pickup and pressure loss it is desirable to incorporate film cooling to provide a protective insulating thermal boundary layer of film along the gas path surface 94, thereby reducing the net heat flux at the wall surface.

To achieve maximum thermal performance using minimal cooling flow for high heat load applications it becomes imperative that both backside internal convective cooling and film cooling configurations be optimally designed to best balance internal convective heat transfer, heat pickup, and pressure loss, while ensuring optimal film cooling performance is also maintained. The cooling configuration represented by cooling passage 110 in FIG. 4 is similar to a counter flow heat exchanger cooling design concept. This design configuration utilizes the cooling flow to provide both backside convective cooling, as well as, external film cooling to maximize the thermal cooling effectiveness of the design. In order to make the cooling configuration viable from a film cooling perspective it is necessary to have adequate back strike distance and a large enough cavity cross-sectional area to ensure manufacturing hole drill criteria is satisfied. To ensure quality film cooling performance it is necessary to minimize the film cooling hole surface angle to mitigate the potential for film separation. Additionally, by maintaining a shallow surface angle of the film cooling hole, the length and convective surface area of the cooling hole will be maximized, thereby increasing the conduction benefits of provided by the presence of the cooling holes. For these reasons the ability to create stepped cooling passage geometries similar to those illustrated in FIG. 4, FIG. 4A and FIG. 4B is imperative to the execution of this type of design concept.

The blade outer air seal 62 could include one or both types of variable cross-sectional area passages 84, 84a. In the example shown in FIG. 4, the blade outer air seal 62 has a cooling circuit 80 that includes both types of passages 84, 84a. In the example shown, the stepped cross-sectional area 100 is positioned at the leading edge 70 and the tapered cross-sectional area 90 is at the trailing edge 72; however, the positions of the passages could be varied as needed. The outlet 88 from the stepped-cross section passage 84a is shown as extending to the leading edge 72 of the blade outer air seal 62; however, this passage 84a could also be configured to have a second passage portion similar to the second passage portion 98 of the tapered cross-section passage 84.

In each configuration, the cooling air passes into the inlets 86, into a first passage section, and then into a main passage section 84, 84a having a reduced cross-sectional area before passing outwardly through outlets 88. By gradually reducing the cross-sectional area of the passages 84, 84a, a relatively high pressure air will be exiting the outlets 88. In this manner, relatively small cross-sectional cooling channel geometries can be incorporated to improve the local design optimization of both the cooling flow distribution and thermal cooling effectiveness requirements to address non-uniformities in external heat load distribution typically observed on the blade outer air seal gas path surface 94.

The blade outer air seal 62 may be produced using a conventional lost wax investment casting process, which utilizes a core and shell mold technique in which molten metal is poured and then solidified. A subsequent leaching process is performed to remove the internal solid core body material. A core body 110 that is used to form the passages 84, 84a is shown in FIG. 4. FIGS. 4A and 4B show other examples of core bodies 110A, 110B. As known, the core body 110 represents the inverse of cooling passages 84, 84a. The core body 110 will be put within a mold to form the blade outer air seal 62. Once material has formed around this core body 110, the core is removed, leaving cavities to provide the cooling air passages 84, 84a. The subject method utilizes a refractory metal core (RMC) material to produce the desired internal cooling passage geometries, as well as, internal geometry features (such as trip strips, pedestals, impingement holes, etc.) used to generate the necessary internal convective heat transfer required to provide the local and bulk thermal cooling effectiveness needed to achieve component durability life goals for specific applications.

Figure 5:
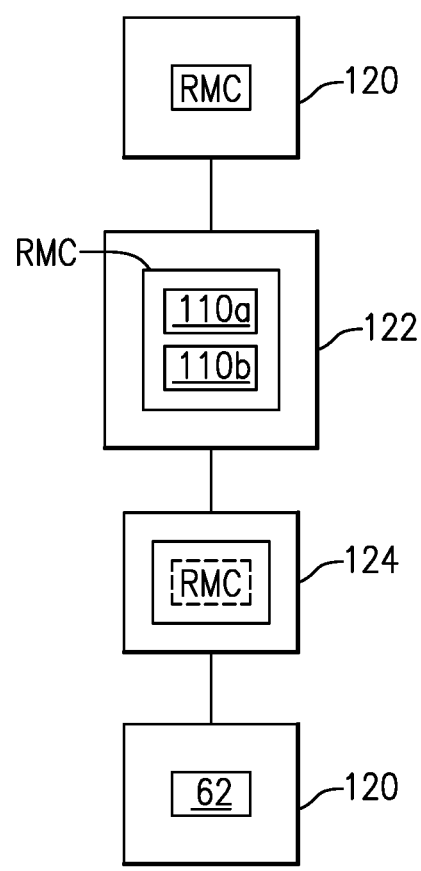
FIG. 5 is a schematic diagram of a method of forming the blade outer air seal.

In one example, the method of forming the blade outer air seal 62 includes the following steps. A refractory metal core is provided to form a desired blade outer air seal configuration as indicated at 120 in FIG. 5. As indicated at 122, the refractory metal core is provided with one or more core body portions 110a, 110b to form cooling passages 84, 84a within the blade outer air seal 62 wherein each core body portion 110a, 110b has a variable cross-sectional area. In one example, one core body portion 110a has the stepped cross-sectional area 100 and one core body portion 110b as the tapered cross-sectional area 90, however other variable cross-sectional areas could also be used. Next, material is provided about the refractory metal core to form the blade outer air seal 62 as indicated at 124. Any suitable material can be used to form the blade outer air seal 62. Finally, as indicated at 126, the core is removed to form the blade outer air seal 62 with the cooling passages having a variable cross-sectional area.

As such, instead of providing different features in the core such as pedestals, trip strips, etc., the thickness of the refractory metal core itself is varied to affect the cooling value of the core to provide a desired performance. By varying the thickness of the core to provide variable cross-sectional area cooling passages the following advantages are provided. Another variable is provided that durability can use to control and optimize cooling high temperature areas to improve part life. The RMC core thickness variation can be created or formed at discrete locations, zones, or regions at one or more locations along a given cooling passage or core cavity as illustrated in FIG. 4—forward cooling passage formed by core body 110, FIG. 4A—cooling passage formed by core body 110A, or FIG. 4B—cooling passage formed by core body 110B. Although the step illustrated in FIG. 4 is depicted as a vertical or radial surface, it is also understood that the discrete changes in cooling passage cross sectional area can also be executed in the form of a chamfered surface, a concave or convex filleted surface, or any combination thereof. The type of transition implemented is dependent on specific geometry requirements, pressure loss, and heat transfer consideration for a particular application. Similarly the RMC core thickness variation can be created or formed to produce a gradual taper or expansion globally along a given cooling passage or cavity as illustrated in FIG. 4—aft cooling passage formed by core body 110. The gradual tapper or expansion of the cooling passage can be created along either and/or both the height dimension or width dimension of the cooling passage in the streamwise direction. The profile of the cooling cavity core could consist of a number of shapes; such as tapered or stepped as discussed above, or could go from thick to thin and back to thick, etc. The core can also be tapered axially or radially in relation to the blade outer air seal depending on the direction of cooling air flow through the core. There are number of manufacturing processes that can be utilized to create or form the discontinuities in the RMC core geometry to create the desired contraction or expansion in the cooling passage cross sectional area. Several methods of manufacturing can be used to generate the desired cooling passage cavity cross sectional area geometries including, but not limited to: grinding, etching, EDM, ECM, coining, mechanical machining, rolling, etc. Additionally, advanced additive manufacturing techniques including Powder Bed Technologies; Select Laser Melting, Electron Beam Melting, as well as, Deposition Technologies; Laser Powder Deposition, Laser Wire Deposition, Electron Beam Wire Deposition can also be used. More specifically, Additive Manufacturing Processes including Direct Metal Laser Sintering (DMLS), and Electron Beam Melting (EBM) can also be utilized to fabricate RMC geometries consistent with those identified herein. Finally, it is more cost effective to change the thickness of the core than to make tooling for a variety of augmentation features such as pedestals, trip strips, etc.

The size and variation in the cross-sectional area is based on pressure loss and heat transfer consideration and is application dependent. Thus, for example, a method of manufacturing a refractory metal core could include providing a refractory metal core configured to form a body for one of the blade outer air seal, airfoil, or combustor component. The refractory metal core is then machined by cutting or punching, for example, to form a detail to define at least one cooling passage in the component to be made from the core. A desired variable cross-sectional area is to be used to form the cooling passage is then determined based on pressure loss and heat transfer consideration for a specific application for the component to be made. The detail is then further machined by grinding, etching, EDM, coining, machining, rolling, etc. to provide a variable thickness of the core such the corresponding cooling passage will have the desired variable cross-sectional area. Once the core is formed with the details to provide the cooling passage with the desired variable cross-sectional areas, material is provided about the core as described above to form the desired blade outer air seal, airfoil, or combustor component.

Figure 6A:
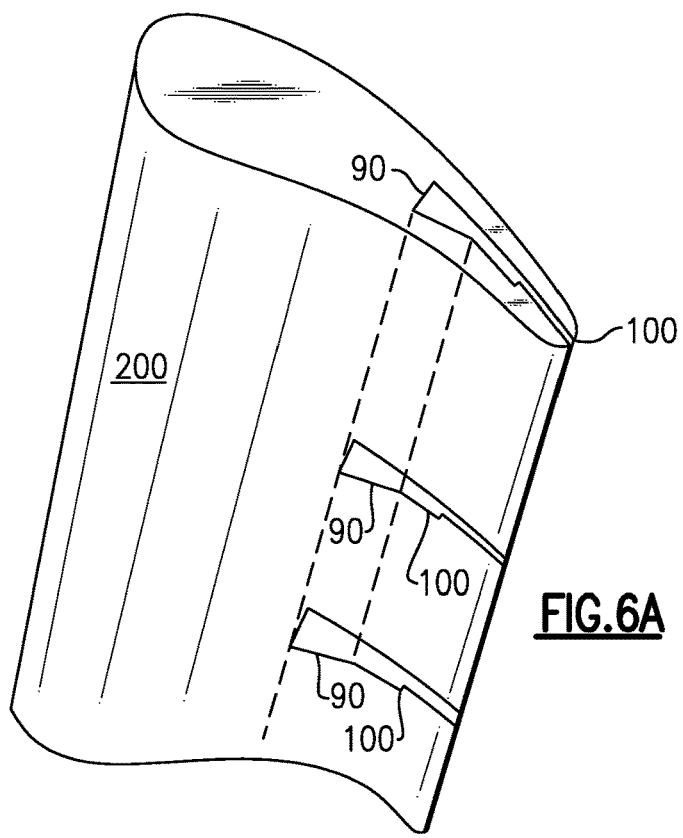
FIG. 6A is a schematic representation of an airfoil for a vane or blade, for example.
Figure 6B:
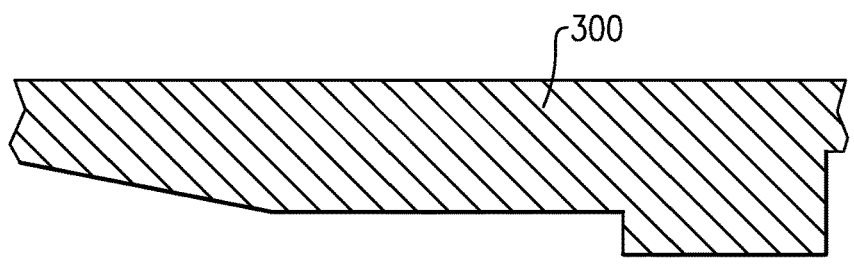
FIG. 6B is a schematic representation of a combustor component.

Further, it should be understood that while the refractory metal core has been described in FIGS. 4, 4A, 4B as being used to form a blade outer air seal, the core could be used to form bodies with cooling passages for other components such as an airfoil 200 (FIG. 6A) for vanes or blades, for example, or for forming a combustor component 300 (FIG. 6B), such as a combustor panel, for example.

Figure 7:
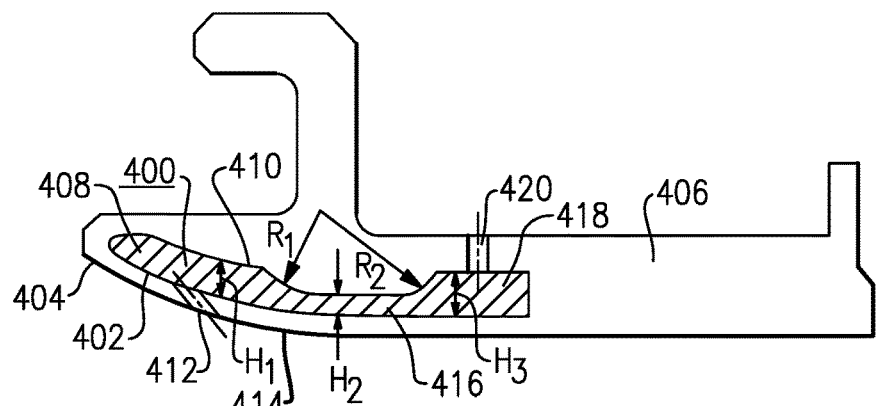
FIG. 7 is a section view of another example of a blade outer air seal incorporating the subject invention.

Additionally, FIG. 4 shows an example of the RMC being planar in nature. In another example shown in FIG. 7, the RMC can be contoured, formed, and shaped to match external conical or curved surface shapes in order to tailor the local wall thickness distribution and through-wall conduction temperature gradients to increase local thermal performance and/or mitigate local thermal strain induced by large temperature gradients. FIG. 7 shows a contour "stepped" RMC core 400 that has a curved profile shape 402 that follows an external contour of the leading edge 404 of a BOAS 406. The curved profile shape 402 can also include filleted/blended contraction and/or expansion transition portions R1, R2 to minimize pressure loss.

Also shown is an expanded region 408, having a larger cross-sectional area, which is located toward a leading edge of a cooling passage 410 formed by the RMC core 400, and from which film holes 412 (only one shown) emanate onto a gas path surface 414. The film holes 412 have a relatively shallow surface angle which is preferred. The expanded region 408 is defined by a height H1 that is greater than a height H2 of a contracted passage portion 416. The contracted passage portion 416 has decreased flow area for increased cooling flow per unit area for maximum heat transfer. The expanded region 408 enables conventional hole drilling methods (laser, EDM, etc.) for the film holes 412 due to the increased back strike distance. This further enables the incorporation of shallow surface angles to provide better cooling capability. It should be understood that the film holes 412 can also be included in any of the other embodiments described herein.

Also shown in the example of FIG. 7, is an increased cross-sectional region 418 adjacent an inlet 420 to the cooling passage 410. This increased cross-sectional region 418 is defined by a height H3 that is greater than H2 and H1. The increased cavity height at this location enables inlet pressure losses to be reduced. It should be understood that the relationship between H1, H2, and H3 can be tailored and varied in relation to each other as needed to provide the desired cooling configuration. Additional internal features such as pedestals, trip strips, etc. can be incorporated in any section of the stepped core passage 410 to tailor pressure loss, internal heat transfer, and cooling air heat pickup.

In each of the examples described above, a refractory metal core comprises a core body 110, 110A, 110B, 400 formed from a refractory metal material, where the core body 110, 110A, 110B, 400 is configured to form one of the blade outer air seal 62 or 406, airfoil 200, or combustor component 300. Any refractory metal material suitable for forming cores can be used such as molybdenum, for example. At least one cooling passage feature formed as part of the core body 110, 110A, 110B, 400 wherein the cooling passage feature is configured to form an associated cooling passage 84, 84a, 410. As discussed in detail above, the cooling passage feature comprises a variable cross-sectional area. The variable cross-section area can comprise, for example, one or more of a planar or curved tapered cross-sectional area, or a planar or curved stepped cross-sectional area.

In one example, the at least one cooling passage feature includes at least one contracted passage portion 416 having a first cross-sectional area and at least one expanded passage portion having a second cross-sectional area greater than the first cross-sectional area. In one example, the at least one expanded passage portion comprises a first expanded passage portion 408 configured to be adjacent to a cooling passage outlet and a second expanded passage portion 418 configured to be adjacent to a cooling passage inlet. The contracted passage portion 416 is positioned between the first 408 and second 418 expanded passage portions.

Thus, as discussed above, the variable thickness RMC that is used to form the BOAS, airfoil, combustor, etc. components is an enabler to obtaining both high internal convection heat transfer due to the smaller cross-sectional flow areas achievable with RMC core material, while also facilitating the incorporation of film cooling holes drilled using conventional EDM and/or laser hole drill manufacturing processes in the larger cross sectional areas of the core. The ability to fabricate a variable thickness RMC allows for great flexibility from a cooling configuration perspective because there is much more flexibility in tailoring internal pressure loss, cooling air heat pickup, and convective heat transfer to better match the non-uniformity in external heat flux distribution along the gas path surface. The ability to incorporate film cooling holes manufactured using conventional processes in the larger cross-sectional flow area also enables more design flexibility from both a convective and film cooled perspective.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
   a body configured to extend around an engine center axis, the body extending between two circumferential sides, and between a leading edge and a trailing edge, and wherein the body includes a radially outer external surface and a radially inner external surface that faces the engine center axis;
   a refractory metal core within the body to form at least one cooling circuit to utilize a fluid to cool the body, and wherein, when the refractory metal core is removed from the body, the at least one cooling circuit includes an inlet, an outlet, and a cooling passage that extends between the inlet and outlet, and wherein the inlet is in the radially outer external surface of the body and the outlet is in the radially inner external surface of the body; and
   wherein the cooling passage of the at least one cooling circuit provides a radial inlet passage portion that extends radially inward from the inlet at the radially outer external surface to connect to a main passage portion and a radial outlet passage portion that extends radially inward from the main passage portion to the outlet in the radially inner external surface, and wherein the main passage portion comprises a linear passage that extends along an entirety of the main passage portion in an axial direction along the engine center axis between the radial inlet and radial outlet passage portions, and wherein the linear passage varies in cross-sectional area in the axial direction between the inlet and outlet.

2. The gas turbine engine component according to claim 1, wherein the linear passage has a stepped or tapered cross-sectional area.

3. The gas turbine engine component according to claim 2, wherein the stepped or tapered cross-sectional area decreases in size from the inlet to the outlet.

4. The gas turbine engine component according to claim 1, wherein the cooling passage comprises a first cooling passage, and wherein the radial inlet passage portion comprises a first radial inlet passage portion and the radial outlet passage portion comprises a first radial outlet passage portion, and wherein the main passage portion of the first cooling passage comprises a first main passage portion that extends in the axial direction between the first radial inlet and first radial outlet passage portions, and including a second cooling passage that has a second main passage portion with a stepped or tapered cross-sectional area, a second radial inlet passage portion that extends radially inward from the radially outer external surface to connect to the second main passage portion, and a second radial outlet passage portion that extends from the second main passage portion to a second outlet in the radially inner external surface, and wherein the second main passage portion comprises a second linear passage that only extends in the axial direction along the engine center axis between the second radial inlet passage portion and the second outlet passage portion.

5. The gas turbine engine component according to claim 4, wherein the stepped or tapered cross-sectional area decreases in size from the second radial inlet passage portion to the second outlet.

6. The gas turbine engine component according to claim 4, wherein the second main passage portion comprises the stepped cross-section area and includes at least a first stepped section and a second stepped section downstream of the first stepped section in a direction of flow extending from the second radial inlet passage portion to the second outlet, and wherein the first stepped section has a greater cross-sectional area than the second stepped section.

7. The gas turbine engine component according to claim 1, wherein the cross-sectional area of the main passage portion progressively increases from the inlet to the outlet, or progressively increases from the outlet to the inlet.

8. The gas turbine engine component according to claim 1, wherein the cross-sectional area of the main passage portion has increasing and decreasing portions between the first radial inlet passage portion and the first radial outlet passage portion.

9. The gas turbine engine component according to claim 1, wherein the body comprises one of a blade outer air seal, airfoil, or combustor component.

10. A gas turbine engine comprising:
    a compressor section rotatable about an engine axis, the compressor section comprising a plurality of stages that include a plurality of compressor blades and vanes;
    a combustor section downstream of the compressor section, the combustor section including at least one combustor component to be cooled;
    a turbine section downstream of the combustor section, the turbine section comprising a plurality of stages that include a plurality of turbine blades and vanes;
    at least one blade outer air seal positioned radially outward of the plurality of compressor or turbine blades, and wherein at least one of the compressor blades and vanes, the turbine blades and vanes, the combustor component, and the blade outer air seal includes a body extending around the engine axis and extending between two circumferential sides, and between a leading edge and a trailing edge, and wherein the body includes a radially outer external surface and a radially inner external surface that faces the engine axis, and a refractory metal core within the body to form at least one cooling circuit within the body to utilize a fluid to cool the body, and wherein, when the refractory metal core is removed from the body, the at least one cooling circuit includes an inlet, an outlet, and a cooling passage that extends between the inlet and outlet, and wherein the inlet is in the radially outer external surface of the body and the outlet is in the radially inner external surface of the body; and
    wherein the cooling passage includes a main passage portion comprising a linear passage that extends along an entirety of the main passage portion in an axial direction along the engine axis between the inlet and the outlet, and wherein the linear passage varies in cross-sectional area in the axial direction between the inlet and outlet.

11. The gas turbine engine according to claim 10, wherein the main passage portion has at least one of:
a tapered cross-sectional area, or
a stepped cross-sectional area.

12. The gas turbine engine according to claim 11 wherein the tapered cross-sectional area or the stepped cross-sectional area decreases in size from the inlet to the outlet or increases in size from the inlet to the outlet.

13. The gas turbine engine according to claim 11, wherein the stepped cross-sectional area or tapered cross-sectional area has both increasing and decreasing portions between the inlet and the outlet.

14. The gas turbine engine according to claim 10, wherein the at least one cooling circuit comprises at least first and second cooling circuits, and wherein the main passage portion of the first cooling circuit has a first variable cross sectional area and the main passage portion of the second cooling circuit comprises a second linear passage that only extends in the axial direction and which has a second variable cross sectional area that is different than the first variable cross-sectional area.

15. The gas turbine engine according to claim 14, wherein the first variable cross-sectional area comprises a tapered cross-sectional area and the second variable cross-sectional area comprises a stepped cross-sectional area.

16. A refractory metal core comprising:
a core body formed from a refractory metal material, wherein the core body is configured to form one of a blade outer air seal, airfoil, or combustor component that extends around an engine center axis, and wherein the blade outer air seal, airfoil, or combustor component includes a radially outer external surface and a radially inner external surface that faces the engine center axis; and
at least one cooling passage feature formed as part of the core body wherein the cooling passage feature is configured to form an associated cooling passage within the one of the blade outer air seal, airfoil, or combustor component, wherein the cooling passage has an inlet and an outlet, and wherein the at least one cooling passage feature provides a first passage portion that extends radially inward from the inlet at the radially outer external surface toward a second passage portion that comprises a linear passage that extends along an entirety of the second passage portion in an axial direction along the engine center axis and transitions into a third passage portion that extends radially inward from the second passage portion to the outlet in the radially inner external surface, and wherein the linear passage varies in cross-sectional area in the axial direction between the first passage portion and the third passage portion.

17. The refractory metal core according to claim 16, wherein the cross-sectional area is at least one of:
a stepped or tapered cross-sectional area, or
wherein the at least one cooling passage feature forms at least a first passage and a second passage, the first passage including the first passage portion, the second passage portion having the stepped or tapered cross-sectional area, and the third passage portion, and the second passage including a fourth passage portion that extends radially inward from the radially outer external surface toward a fifth passage portion that comprises another linear passage that extends only in the axial direction along the engine center axis and transitions into a sixth passage portion that extends from the fifth passage portion to a second outlet in the radially inner external surface, and wherein the fifth passage portion has a stepped or tapered cross-sectional area.

18. The refractory metal core according to claim 16, wherein the second passage portion includes at least one contracted passage portion having a first cross-sectional area and at least one expanded passage portion having a second cross-sectional area greater than the first cross-sectional area.

19. The refractory metal core according to claim 18, wherein the at least one expanded passage portion comprises a first expanded passage portion configured to be adjacent to the outlet and a second expanded passage portion configured to be adjacent to the inlet, and wherein the at least one contracted passage portion is positioned between the first and second expanded passage portions.

20. The gas turbine engine according to claim 10, wherein the at least one cooling circuit provides a radial inlet passage portion that extends radially inward from the inlet at the radially outer external surface to connect to the main passage portion and a radial outlet passage portion that extends radially inward from the main passage portion to the outlet in the radially inner external surface, and wherein the main passage portion comprises the linear passage that only extends in the axial direction along the engine axis between the radial inlet and radial outlet passage portions and which does not include any curved portions.

21. The gas turbine engine according to claim 20, wherein the radial inlet passage portion comprises a first radial inlet passage portion and the radial outlet passage portion comprises a first radial outlet passage portion, and wherein the main passage portion comprises a first main passage portion comprising the linear passage that only extends in the axial direction between the first radial inlet and first radial outlet passage portions, and including a second main passage portion that has a stepped or tapered cross-sectional area, a second radial inlet passage portion that extends radially inward from the radially outer external surface to connect to the second main passage portion and a second outlet passage portion that extends from the second main passage portion to a second outlet in the radially inner external surface, and wherein the second main passage portion comprises a second linear passage that only extends in the axial direction along the engine center axis between the second radial inlet passage and the second outlet passage portions.

22. The gas turbine engine according to claim 21, wherein the first main passage portion has a stepped or tapered cross-sectional area.

23. The gas turbine engine according to claim 22, wherein the second outlet is near the leading edge, and wherein the first main passage portion comprises a separate passage that is downstream of the second main passage portion.

24. The refractory metal core according to claim 17, wherein the at least one cooling passage feature forms at least the first passage and the second passage, and wherein the second outlet is near the leading edge, and wherein the second passage portion comprises a separate passage that is downstream of the fifth passage portion.

25. The gas turbine engine component according to claim 4, wherein the first main passage portion has a stepped or tapered cross-sectional area.

26. The gas turbine engine component according to claim 4, wherein the second outlet is near the leading edge, and wherein the first main passage portion comprises a separate passage that is downstream of the second main passage portion.

\* \* \* \* \*